United States Patent
Brower, Jr. et al.

(10) Patent No.: US 6,681,290 B2
(45) Date of Patent: Jan. 20, 2004

(54) PHYSICAL DATA LAYOUT TO REDUCE SEEKS IN A RAID SYSTEM

(75) Inventors: William John Brower, Jr., Tucson, AZ (US); Carl Evan Jones, Tucson, AZ (US); Joe Edward Smothers, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/772,265

(22) Filed: Jan. 29, 2001

(65) Prior Publication Data

US 2002/0103967 A1 Aug. 1, 2002

(51) Int. Cl.⁷ ............................................. G06F 12/00
(52) U.S. Cl. ..................... 711/114; 707/204; 713/1; 713/2; 713/100
(58) Field of Search ............................. 707/204; 713/1, 713/2, 100; 711/114

(56) References Cited

U.S. PATENT DOCUMENTS

| | | |
|---|---|---|
| 5,457,791 A | 10/1995 | Matsumoto et al. |
| 5,592,648 A | 1/1997 | Schultz et al. |
| 5,708,793 A | 1/1998 | Franaszek et al. |
| 5,778,252 A | 7/1998 | Sangveraphunsiri et al. |
| 5,809,300 A | 9/1998 | Utsumi et al. |
| 5,900,007 A | 5/1999 | Nunnelley et al. |
| 5,909,691 A | 6/1999 | Schultz et al. |
| 6,493,729 B2 * | 12/2002 | Gusler et al. ............... 707/204 |

* cited by examiner

Primary Examiner—Mano Padmanabhan
Assistant Examiner—Mehdi Namazi
(74) Attorney, Agent, or Firm—Robert M. Sullivan; Bracewell & Patterson, L.L.P.

(57) ABSTRACT

A data storage subsystem which reduces seek time, by defining a logical storage space wherein part of the logical storage space is defined to correspond to a primary storage space of a first physical data storage device, and correspond to a secondary storage space of a second physical data storage device, and another part of the logical storage space is defined to correspond to a primary storage space of the second physical data storage device, and correspond to a secondary storage space of the first physical data storage device. For hard disk drives having an arm assembly with a read/write head, the average seek distance for both drives reduced, since the pivoting arm assembly need not travel as far to reach each physical storage address within a primary storage area. The invention may additionally take advantage of geometric or other aspects of the storage devices which result in some portion of the device having a faster access time that another portion. For hard disk drives which assign a larger number of logical blocks to the outer tracks of the disk than to the inner tracks, the storage controller can map the primary storage space of a given one of the drives to the outer tracks of the drive.

22 Claims, 4 Drawing Sheets

PHYSICAL DATA LAYOUT TO REDUCE SEEKS IN A RAID SYSTEM

BACKGROUND OF THE INVENTION

1. Field of the Invention

The present invention generally relates to computer systems, specifically to data storage devices for computer systems, and more particularly to a method of writing data to and reading data from a redundant array of independent disks (RAID) so as to substantially reduce or minimize the time required to complete the seek operations associated with such accesses.

2. Description of Related Art

Computer systems use a wide variety of devices for permanently storing data, i.e., in a non-volatile manner such that power to the computer system may be turned off but the data (including both user information and computer programs) are retained for future access. These direct access storage devices (DASDs) typically use a magnetic or optical medium to preserve the data. The most common data storage device has one or more generally circular disks or platters formed from a non-magnetic substrate, with a ferromagnetic coating. The disks are mounted on a spindle motor and rotate, and a pivoting arm assembly having electromagnetic transducers is used to read from, and write to, the disks. The media-bearing surfaces of the disks are partitioned into concentric tracks or cylinders. This particular magnetic storage device is commonly referred to as a hard disk drive (HDD), and is usually packaged in a modular enclosure so that it may be easily installed in and removed from the computer system.

Many computer systems use multiple HDDs for greater storage capability, or for fault tolerance. For example, U.S. Pat. No. 5,778,252 discloses an interface for concurrent accesses to multiple disk drives of a computer. That interface is an enhanced version of the industry-standard integrated drive electronics (IDE) disk drive. The device gangs multiple IDE drives together to present the image of a single, larger and faster IDE drive.

A more common example of a multi-disk storage system is the so-called redundant array of independent (or inexpensive) disks (RAID). In the RAID design, data is placed on multiple hard disks to allow input/output (I/O) operations to be completed in an overlapping manner, thereby improving system performance. The same data is recorded on more than one disk, so the fault tolerance of the system increases with the redundancy factor. A general example of a RAID design may be found in U.S. Pat. No. 5,592,648.

FIG. 1 illustrates, conceptually, the mapping of logical storage to physical storage in a typical RAID system 1. A logical storage location 2 of a logical disk device 3 corresponds to two or more physical storage locations 4, 5 on respective physical disk drives 6, 7. The RAID controller card maps the logical read/write commands to the physical memory arrays. Read performance is improved since multiple read operations can simultaneously execute on separate physical devices, although write performance is the same as for single disk storage. FIG. 1 illustrates an exemplary RAID-1 system whose logical disk contains 20,000,000 logical blocks, each 512 bytes, or approximately 10 gigabytes (GB) of total memory. The logical disk is implemented physically with the two 20,000,000 block drives 6, 7.

In the simplest RAID design (RAID-1), the physical locations are the same (disk mirroring), which is illustrated in FIG. 1. Other RAID systems can use various types of "striping" to partition the space of each drive 6, 7. The space is divided up into various sized units ranging from a typical sector of 512 bytes, to several megabytes (MB). In the RAID-10 design, the system has logical stripes in which each stripe is a RAID-1 array of drives. RAID systems can also incorporate other known features for permanent storage devices, such as error detection (e.g., parity information), error checking and correcting (ECC), or caching.

One important factor in the performance of a disk drive is the time it takes to move the transducer (read/write head) on the pivoting arm assembly from one track or cylinder to another (a "seek"). The arm assembly may have to move the entire length of the physical drive in some cases, since the entire length of a single device is used to store all primary copies of the recorded values (and all secondary copies of the values are likewise stored across the entire length of a single device). The geometry or physical layout of the disk drive's storage tracks affects seek time. Logical block numbers are assigned sequentially from the inner cylinders to the outer cylinders of the physical drive. In general, for a RAID-1 system such as shown in FIG. 1, the average seek distance is one-third of the drive.

In spite of the performance benefits achieved using RAID systems, seek time continues to be one of the primary causes for data access latency. It would, therefore, be desirable to devise an improved method of accessing a RAID system in order to reduce seek time. It would be further advantageous if the method could take advantage of existing hardware designs and storage geometry, so as not to add further complexity and cost to the design.

SUMMARY OF THE INVENTION

It is therefore one object of the present invention to provide an improved data storage device for a computer system.

It is another object of the present invention to provide a RAID-type data storage system (particularly a RAID-1 or RAID-10 system) having a substantially reduced average seek time.

It is yet another object of the present invention to provide a method of accessing a disk drive in a RAID-type system which takes advantage of the driver's physical storage geometry.

The foregoing objects are achieved in a data storage subsystem, generally comprising a plurality of physical data storage devices (such as hard disk drives) and means, connected to the storage devices, for defining a logical memory space wherein (i) a first portion of the logical memory space is defined to correspond to a primary storage space of a first one of the physical data storage devices, and correspond to a secondary storage space of a second one of the physical data storage devices, and (ii) a second portion of the logical memory space is defined to correspond to a primary storage space of the second physical data storage device, and correspond to a secondary storage space of the first physical data storage device. In this manner, the average seek distance for both devices is reduced, since the pivoting arm assembly which scans the surfaces of the hard disks need not travel as far to reach each physical storage address within a primary storage area.

The invention may additionally take advantage of geometric or other aspects of the storage devices which result in some portion of the device having a faster access time than another portion. More specifically, for hard disk drives which assign a larger number of logical blocks to the outer tracks of the disk than to the inner tracks, the memory controller can map the primary storage space of a given one of the drives to the outer tracks of the drive.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
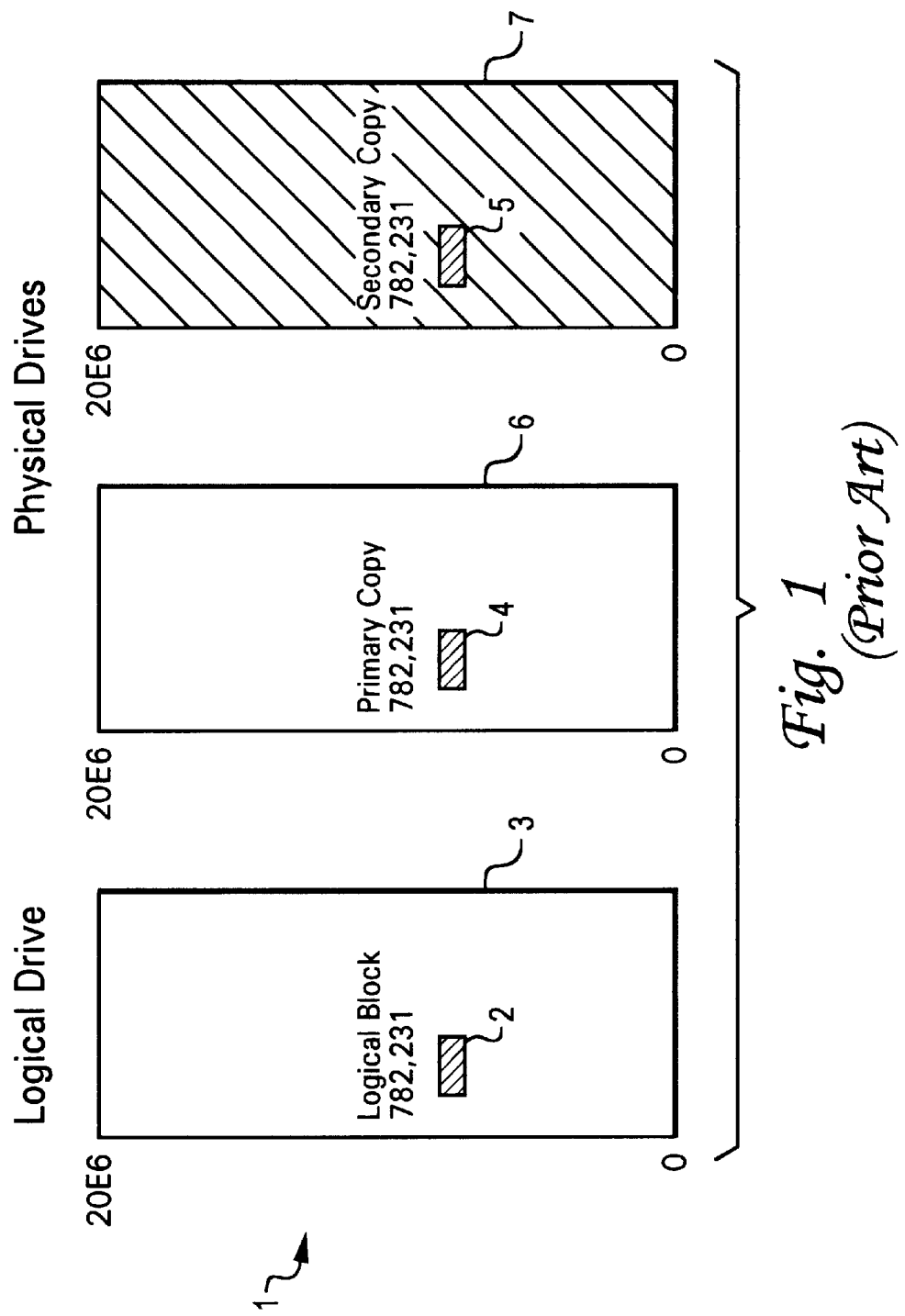
FIG. 1 is a pictorial representation of a conventional redundant array of independent disks (RAID), illustrating the correspondence between logical and physical storage locations in a RAID system.
Figure 2:
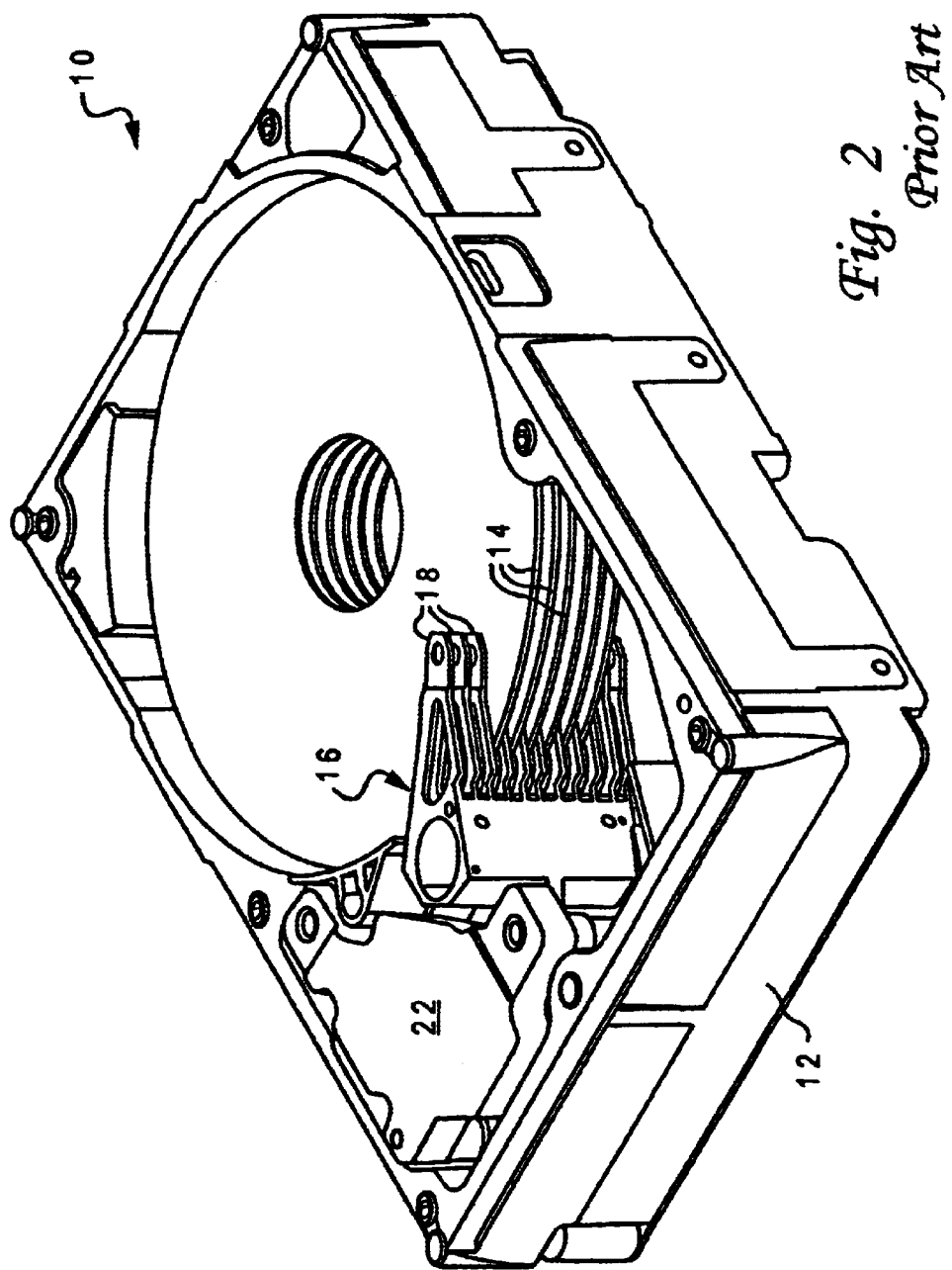
FIG. 2 is a perspective view of an exemplary hard disk drive which may be used with the present invention as part of an improved RAID system.

With reference now to the figures, and in particular with reference to FIG. 2, there is depicted an exemplary embodiment 10 of a hard disk drive (HDD) which may be used in conjunction with the present invention. HDD 10 has a shroud or enclosure 12, one or more disks 14, a rotary actuator assembly 16, and associated control electronics (not shown). A cover which is part of enclosure 12 has been removed in FIG. 1. Disks 14 are appropriately mounted on a spindle which is attached to a spindle motor, and thus rotatable with respect to enclosure 12.

The upper and lower surfaces of each of the disks 14 are coated with a magnetic material to allow the writing of data onto the surfaces using the principle of magnetic induction. Rotary actuator assembly 16 has a plurality of arm/suspension members 18 supporting electromagnetic transducers (heads) at their tips, which are used to read data from and write data to the magnetic media-bearing surfaces of disks 14. The movement of actuator assembly 16 is controlled by a voice-coil motor (VCM) 22.

The magnetic media-bearing surfaces of disks 14 have a plurality of generally concentric tracks for recording blocks of information. Each of these tracks is divided into multiple sectors. The theoretical location of any given set of data bits can accordingly be computed based on the track number and position within the particular sector. Based on this assumed location, the HDD control electronics generate appropriate electrical signals that cause VCM 22 to move the read/write heads on arm/suspension members 18 over the desired portions of disks 14. Thus, when the heads have been located over the proper tracks, as the disks 14 are spinning, data can be read from or written to the tracks via the inductive heads. The magnetic disks may be divided into several different areas according to industry standards.

Figure 3:
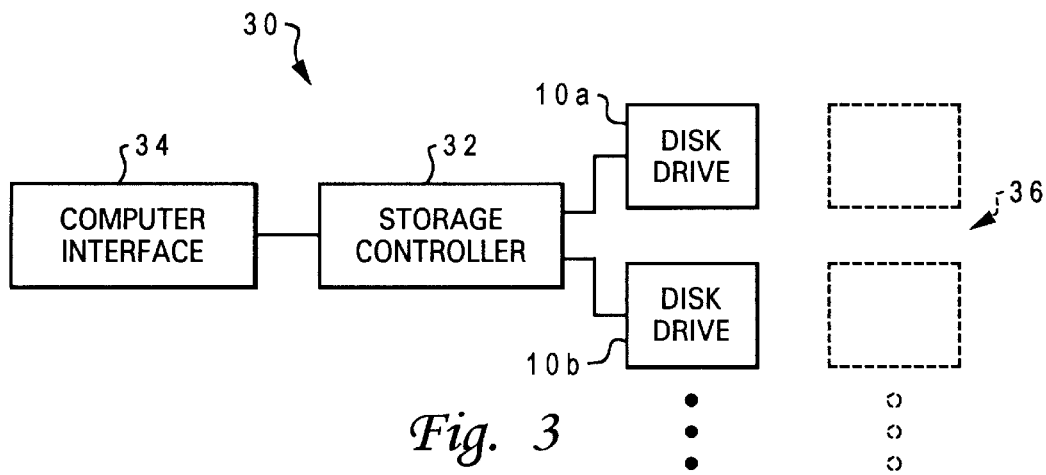
FIG. 3 is a block diagram illustrating a simple embodiment of the present invention as a variation of a RAID-1 system.

Referring now to FIG. 3, the invention uses two or more drives such as HDD 10 to implement a data storage system 30 in the form of a redundant array of independent (or inexpensive) disks (RAID). RAID system 30 includes a storage controller 32, interface electronics 34 for connecting memory controller 32 to the remainder of a computer system, and at least two HDD's 10a and 10b. More than two HDD's can be used. The invention is not dependent on any particular interface. Common interfaces include FC-AL, SCSI, SSA and IDE. Memory controller 32 may be integrated into a hardware unit such as a PCI adapter, or may be implemented as software.

RAID system 30 comports with the formal definition of a RAID-1 design in that no striping is used, but every recorded value is stored in each of the disks 10a and 10b to provide full redundancy. In an alternative implementation, multiple arrays of HDD's, such as that indicated at 36, can be used to implement the invention in a fashion similar to a RAID-10 design. Those skilled in the art will thus appreciate that the present invention is not limited to the specific embodiment of system 30, as it may be used in combination with various known features of RAID systems.

Figure 4:
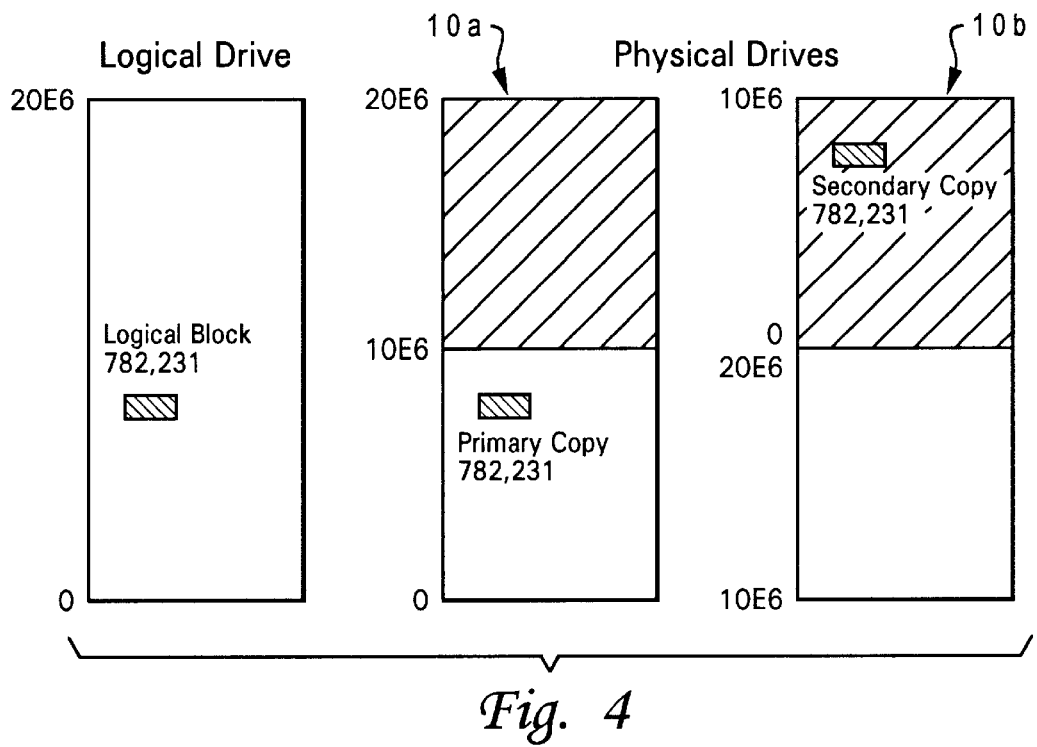
FIG. 4 is a pictorial representation of the correspondence between logical and physical storage devices for the system of FIG. 3.

In RAID system 30, disk drives 10a and 10b are paired, as further illustrated in FIG. 4. Whenever data is recorded, a copy of the data is written to each of the two drives. When data is read, only one of the two copies need be read. However, in contrast to the prior art, there is not a single "primary" drive, nor a single "secondary" drive. Rather, the primary storage locations are divided between the two drives 10a and 10b, as are the secondary storage locations. In this specific implementation, each drive has one-half of the primary copies, and one-half of the secondary copies. In this manner, if reads would only be serviced from the primary copy, and all operations were reads, then the average seek distance would theoretically be one-third of the one-half length of the drive that is used for the primary copies, or only one-sixth of the total length of the drive.

Figure 5:
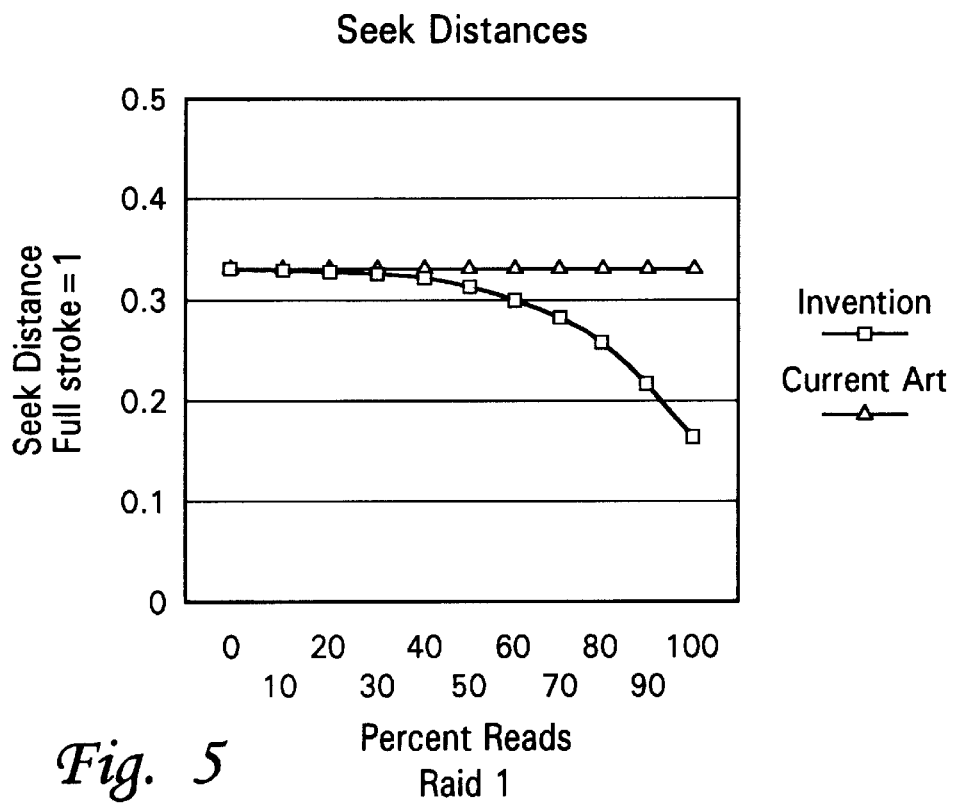
FIG. 5 is a graph of the estimated percentage reduction in seek distance achieved by the present invention as compared to the prior art.
Figure 6:
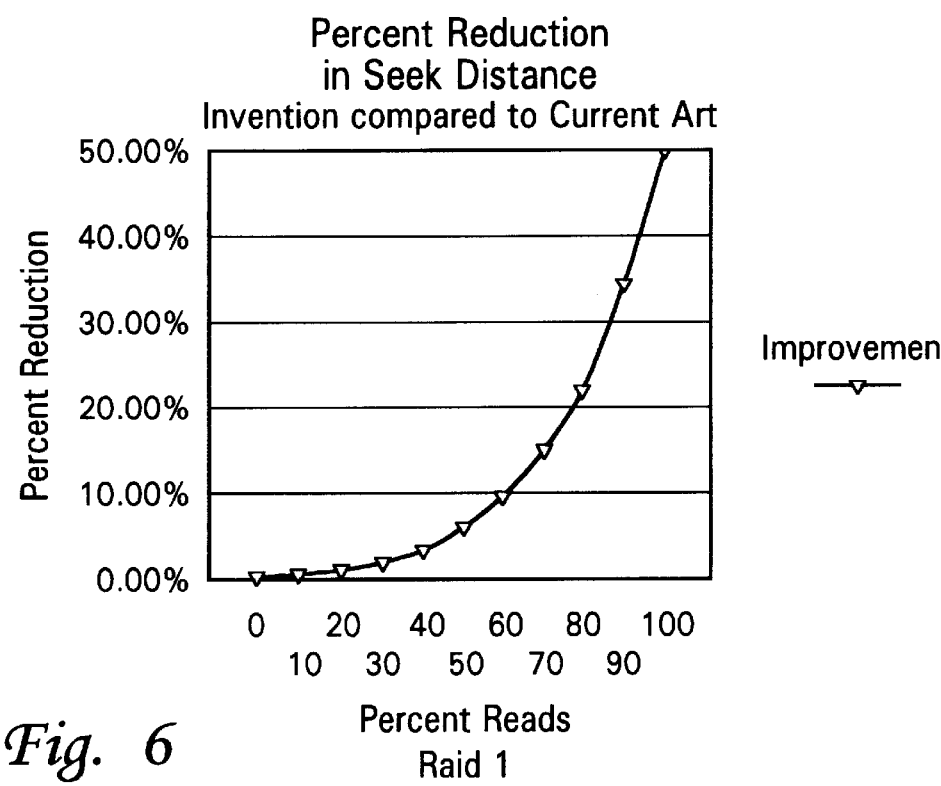
FIG. 6 is a graph of the estimated seek distances for the present invention as a function of the percentage of read versus write operations.

All operations are not reads however. On write operations, both drives are involved. The average seek for the primary copy is still one-sixth of the drive, but the secondary copy requires a seek to the other half of the drive. Therefore, if all operations are writes, the average overall seek distance is still one-third of the drive. The present invention, however, leverages this difference between read and write seek times, and takes advantage of the fact that read operations tend to outnumber write operations for most workloads. FIG. 5 shows the results of a simulation to examine how the average seek distance varies with the percent of reads in the workload. A noticeable improvement in seek distance is apparent with as little as 20% read operations. FIG. 6 shows the percent reduction in seek distance, as compared to the prior art, as a function of the percent of reads. A commonly used read-to-write ratio is 70%. For the 70% case, there is an estimated 14.6% improvement.

There are many ways to map the logical blocks of the logical drive onto the logical blocks of the physical drive. The following is an example of one method to clarify how it might be done. Consider a logical drive that has 1000 logical blocks and is to be mapped onto two physical drives, each also with 1000 logical blocks to form a RAID 1 system. The logical blocks are identified by their logical block address, LBA. The blocks on the physical drives are addressed sequentially from LBA 1 which is on the inner track to LBA 1000 on the outer track. The goal is to place the primary copies on a physical drive on the outer half of the drive, i.e., in blocks 501 to 1000.

Referring to the two physical drives as Drive A and Drive B, the simplest mapping is to map the logical drive's LBAs between 1 to 500 onto Drive A by taking the logical drive's LBA and adding 500. Thus, the logical drive's LBA of 500 would be Drive A's LBA of 1000. The logical drive's LBAs from 501 to 1000 are mapped to Drive A by subtracting 500 from the LBA. Thus, the logical drive's LBA of 1000 would be mapped to Drive A's LBA of 500. All logical drives' LBAs are mapped directly onto Drive B, e.g., the logical drive's LBA of 500 would be Drive B's LBA of 500 and the logical drive's LBA of 1000 would be 1000. This mapping results in the primary copy for LBAs of 1 to 500 being on Drive A and LBAs of 501 to 1000 being on Drive B.

The above mapping is a disadvantage under file systems that tend to fill a logical drive in LBA sequence. If the logical drive is not full, the two primary copy ranges will have differing amounts of data. In fact, a logical drive that is less than half filled may have no data in the primary copy on Drive B. To mitigate this effect, a more sophisticated approach may be taken. On such approach is to divide the logical drives into N equal ranges and numbering the ranges 1 to N. The odd ranges would be mapped to the outer half of Drive A and the even ranges mapped to the outer half of Drive B.

While the foregoing examples divide the disks in half for simplicity, a more complex mapping function may be used to minimize workload-induced skew. For example, logical blocks may be striped in blocks smaller than a working set. A working set is the subset of data in the array that is being used at any given time. The data is ideally distributed in such a way that half of any working set is on one drive and the other half is on the other drive. In this manner, an individual read operation may be performed without spanning across both disks. If a RAID-10 type implementation is used, the striping may address this behavior. Other techniques may be used as well to enhance these results. For example, the foregoing implementation does not invoke queuing, which reduces seeks further by reordering operations to more efficiently carry out the accesses. Queuing increases the benefit of the present invention by additionally reducing skew between the two disks.

The seek distance analysis heretofore ignores the fact that in modern disk drives the number of logical blocks per track on the outer tracks is greater than the number of logical blocks per track on the inner tracks. The primary copies may thus be advantageously placed on the outer tracks to reduce the average seek times even more.

The present invention thus significantly reduces the average seek time per operation for various raid systems without requiring head position knowledge in the RAID controller. The invention may further be easily implemented with existing hardware (e.g., the disk drives), and without significantly increasing the cost of the controller.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of providing a storage space for a computer system, comprising the steps of:

partitioning each of a first and a second of at least two physical data storage devices into primary and secondary storage spaces, wherein the primary storage space of the first physical data storage device has a faster average seek time than the secondary storage space of the second physical data storage device, and wherein the primary storage space of the second physical data storage device has a faster average seek time than the secondary storage space of the first physical data storage device;

defining a logical storage space within a storage controller connected to the physical data storage devices, wherein (i) a first portion of the logical storage space is defined to correspond to the primary storage space of the first of the at least two physical data storage devices, and correspond to the secondary storage space of the second of the at least two physical data storage devices, and (ii) a second portion of the logical storage space is defined to correspond to the primary storage space of the second physical data storage device, and correspond to the secondary storage space of the first physical data storage device.

2. The method of claim 1 wherein the storage controller performs said partitioning step.

3. The method of claim 1 further comprising the step of providing an interface between the storage controller and a computer system.

4. The method of claim 1 wherein said partitioning step divides the first physical data storage device into halves to create its primary and second storage spaces, and divides the second physical data storage device into halves to create its primary and second storage spaces.

5. The method of claim 1 wherein said defining step stripes multiple blocks of the logical storage space to reduce workload-induced skew between the first and second physical data storage devices.

6. The method of claim 1 wherein:

the logical storage space is a first logical storage space; and said defining step further defines the first logical storage space as a stripe of a second logical storage space.

7. The method of claim 1 wherein:

each of the physical data storage devices includes one or more spinning disks having at least one media-bearing surface with concentric outer and inner storage tracks;

each of the physical data storage devices assigns a number of logical blocks to the outer tracks which is greater than a number of logical blocks assigned to the inner tracks; and said partitioning step places the primary storage space of a given one of the physical data storage devices in the outer tracks of the given device.

8. An apparatus for permanently storing information to be used by a computer system, comprising:

a plurality of physical data storage devices, wherein each of the plurality of physical data storage devices are partitioned into primary and secondary storage spaces, and wherein the primary storage space of a first physical data storage device of the plurality of physical data storage devices has a faster average seek time than the secondary storage space of a second physical data storage device of the plurality of physical data storage devices, and wherein the primary storage space of the second physical data storage device has a faster average seek time than the secondary storage space of the first physical data storage device; and means, connected to said physical data storage devices, for defining a logical storage space wherein (i) a first portion of the logical storage space is defined to correspond to a the primary storage space of the first physical data storage device, and correspond to the secondary storage space of a second one of the physical data storage devices, and (ii) a second portion of the logical storage space is defined to correspond to the primary storage space of the second physical data storage device, and correspond to the secondary storage space of the first physical data storage device.

9. The apparatus of claim 8 wherein said defining means includes a storage controller which maps logical addresses in the logical storage space to physical addresses in the primary and secondary storage spaces of the first and second physical data storage devices.

10. The apparatus of claim 9 further comprising means for interfacing said storage controller with a computer system.

11. The apparatus of claim 8 wherein said defining means divides the first physical data storage device into halves to create its primary and second storage spaces, and divides the second physical data storage device into halves to create its primary and second storage spaces.

12. The apparatus of claim 8 wherein said defining means stripes multiple blocks of the logical storage space to reduce workload-induced skew between the first and second physical data storage devices.

13. The apparatus of claim 8 wherein:
the logical storage space is a first logical storage space; and
said defining means further defines the first logical storage space as a stripe of a second logical storage space.

14. The apparatus of claim 8 wherein:
each of the physical data storage devices includes one or more spinning disks having at least one media-bearing surface with concentric outer and inner storage tracks;
each of the physical data storage devices assigns a number of logical blocks to the outer tracks which is greater than a number of logical blocks assigned to the inner tracks; and
said defining means places the primary storage space of a given one of the physical data storage devices in the outer tracks of the given device.

15. A data storage system comprising:
at least first and second hard disk drives, each including at least one rotating platter having a media-bearing surface thereon, any given one of the media-bearing surfaces having a plurality of concentric tracks, including inner and outer tracks, wherein the outer tracks have a faster average seek time than the inner tracks;
a storage controller mapping a logical storage space onto the first and second hard disk drives, by defining a correspondence between a first portion of the logical storage space, a primary storage area overlying the outer tracks of the first hard disk drive, and a redundant secondary storage area overlying the inner tracks of the second hard disk drive, wherein the secondary storage area of the second hard disk drive contains a copy of a portion of the primary storage area of the first hard disk drive, and by further defining a correspondence between a second portion of the logical storage space, another primary storage area overlying the outer tracks of the second hard disk drive, and another redundant secondary storage area overlying the inner tracks of the first hard disk drive, wherein another redundant secondary storage area of the first hard disk drive contains a copy of a portion of another primary storage area of the second hard disk drive; and means for interfacing the storage controller with an external data processing system.

16. The data storage system of claim 14 wherein said storage controller divides the first hard disk drive into halves to create its primary and second storage spaces, and divides the second hard disk drive into halves to create its primary and second storage spaces.

17. The data storage system of claim 14 wherein the first and second hard disks constitute a stripe of a RAID-10 type storage system.

18. A computer program product for a computer system having at least two physical data storage devices each of which is partitioned into primary and secondary storage spaces, comprising:
a storage medium containing a first and a second of the at least two physical storage devices, wherein the primary storage space of the first physical data storage device has a faster average seek time than the secondary storage space of the second physical data storage device, and wherein the primary storage space of the second physical data storage device has a faster average seek time than the secondary storage space of the first physical data storage device; and program instructions for defining a logical storage space within a storage controller connected to the physical data storage devices, wherein (i) a first portion of the logical storage space is defined to correspond to the primary storage space of the first of the at least two physical data storage devices, and correspond to the secondary storage space of the second of the at least two physical data storage devices, and (ii) a second portion of the logical storage space is defined to correspond to the primary storage space of the second physical data storage device, and correspond to the secondary storage space of the first physical data storage device.

19. The computer program product of claim 18 wherein said program instructions further partition the two physical data storage devices into the primary and secondary storage spaces.

20. The computer program product of claim 19 wherein said program instructions partition the first physical data storage device into halves to create its primary and secondary storage spaces, and divides the second physical data storage device into halves to create its primary and secondary storage spaces.

21. The computer program product of claim 18 wherein said program instructions further define the logical storage space by striping multiple blocks of the logical storage space to reduce workload-induced skew between the first and second physical data storage devices.

22. The computer program product of claim 18 wherein the logical storage space is a first logical storage space, and the program instructions further define the first logical storage space as a stripe of a second logical storage space.

* * * * *